United States Patent [19]

Sakano

[11] Patent Number: 4,637,220

[45] Date of Patent: Jan. 20, 1987

[54] REFRIGERATION SYSTEM FOR BOTH VEHICLE AIR CONDITIONER AND REFRIGERATOR

[75] Inventor: Riichi Sakano, Saitama, Japan

[73] Assignee: Sanden Corporation, Gunma, Japan

[21] Appl. No.: 809,233

[22] Filed: Dec. 16, 1985

[30] Foreign Application Priority Data

Dec. 14, 1984 [JP] Japan .................. 59-264234

[51] Int. Cl.⁴ .............................................. F25B 5/00
[52] U.S. Cl. ........................................ 62/200; 62/204; 62/213; 62/244
[58] Field of Search ............... 62/200, 199, 197, 198, 62/204, 205, 207, 210, 211, 212, 213, 222, 223, 224, 225, 243, 244, 231, 157; 236/46 R, 46 F

[56] References Cited

U.S. PATENT DOCUMENTS

| | | | |
|---|---|---|---|
| 4,439,998 | 4/1984 | Horvay et al. | 62/200 X |
| 4,459,819 | 7/1984 | Hargraves | 62/212 |
| 4,483,151 | 11/1984 | Fujioka et al. | 62/244 X |
| 4,523,435 | 6/1985 | Lord | 62/212 |
| 4,565,072 | 1/1986 | Fujiwara et al. | 62/200 X |

*Primary Examiner*—Harry Tanner
*Attorney, Agent, or Firm*—Banner, Birch, McKie & Beckett

[57] ABSTRACT

A refrigeration system having two evaporators to function as both an air conditioner and refrigerator of a vehicle is disclosed. The two evaporators are connected parallel with one another, with one of the two evaporators being disposed in the duct portion of the air conditioner and other being disposed in the refrigerator. An electrical expansion valve is serially connected with the inlet side of the air conditioner evaporator for controlling the flow of refrigerant to it. A shutoff valve for controlling the opening and closing of the line, and an expansion device, are serially connected ahead of the inlet side of the refrigerator evaporator. When the shutoff valve is closed, the operation of the electrical expansion valve is controlled by the change in temperature of refrigerant through the air conditioner evaporator; and when the shutoff valve is open, the operation of the expansion valve is controlled by the temperature of refrigerant in the refrigerator evaporator. Also, the opening and closing of the shutoff valve may be controlled either by the temperature of refrigerant in the refrigerator evaporator or by a timer device. The invention permits adequate control of both the temperature in the vehicle's passenger compartment and the temperature in the refrigerator, by a single refrigeration system.

7 Claims, 8 Drawing Figures

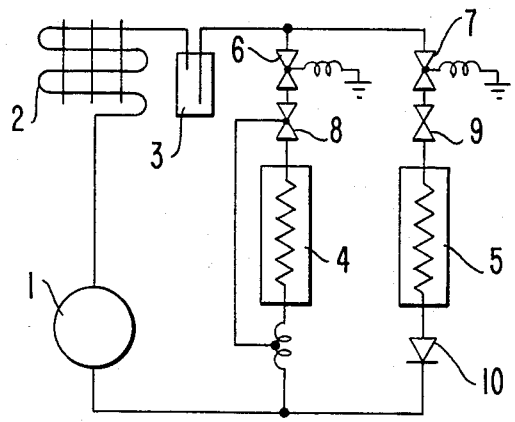
FIG. 1
(PRIOR ART)
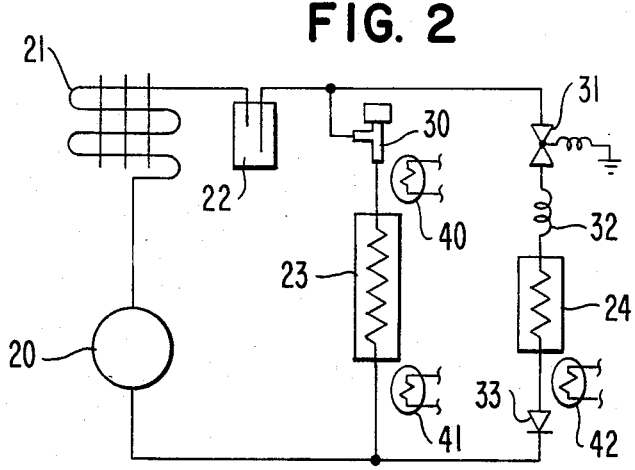
FIG. 2
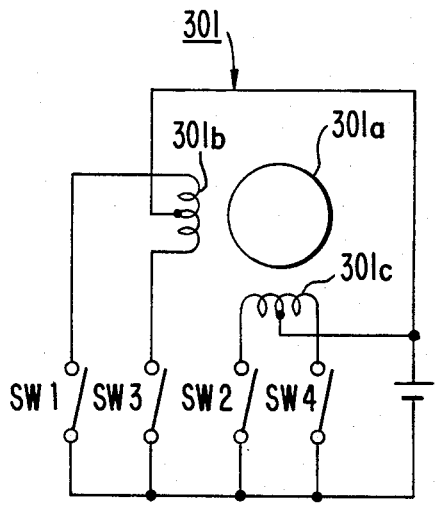
FIG. 3
FIG. 4
| SEQUENCE | 1 | 2 | 3 | 4 | 1 |
|---|---|---|---|---|---|
| SW 1 | ON | OFF | OFF | ON | ON |
| SW 2 | ON | ON | OFF | OFF | ON |
| SW 3 | OFF | ON | ON | OFF | OFF |
| SW 4 | OFF | OFF | ON | ON | OFF |
| OPERATION OF VALVE | CLOSED VALVE ← | | | → | OPEN VALVE |

4,637,220

REFRIGERATION SYSTEM FOR BOTH VEHICLE AIR CONDITIONER AND REFRIGERATOR

BACKGROUND OF THE INVENTION

This invention relates to a refrigeration system suitable for use in a vehicle, and more particularly, to an improvement enabling the use of both an air conditioner to cool the vehicle's passenger compartment and a refrigerator disposed within the vehicle.

Generally, the small-volume refrigerator which is disposed in the compartment of a vehicle is cooled by a part of the cooled air which is conducted from a refrigeration system for the vehicle air conditioner. However, in this construction of the air conditioner and refrigerator, the location of the refrigerator is restricted, because the conduit arrangement from the air conditioner must be considered. Furthermore, the temperature in the refrigerator depends on the operating condition of the air conditioner; therefore, the refrigerator compartment is often not cooled sufficiently to produce ice. This is due to the fact that the interior of the refrigerator is cooled by only that part of the cooled air which passes through the refrigerator section of the vehicle air conditioner.

One solution is to provide the refrigeration system with two evaporators connected in parallel to achieve independent cooling in both the passenger compartment and the refrigerator compartment. This refrigeration system will be described, hereinafter, with reference to FIG. 1.

FIG. 1 shows a diagramatic refrigerant circuit which comprises a compressor 1, a condenser 2, a receiver and dryer 3 and two evaporators 4 and 5, connected to form a closed loop refrigeration circuit. One of the two evaporators 4 is disposed in a duct of the vehicle's air conditioner to cool the passenger compartment, and the other evaporator 5 is disposed in a refrigerator to cool the refrigerator compartment. Evaporators 4 and 5 are connected in parallel, and flow of the refrigerant through them is controlled by the magnetic valves 6 and 7 disposed on the inlet side of evaporators 4 and 5, respectively. Expansion valves 8 and 9 are also disposed on the inlet side of evaporators 4 and 5, respectively, with expansion valve 8 (connected to air conditioning evaporator 4) being controlled in accordance with the refrigerant temperature at the outlet side of evaporator 4. A check valve 10 is disposed on the outlet side of refrigerator evaporator 5.

In this construction of the refrigerant circuit, the circuit requires two magnetic valves and two expansion valves to control the operation of the two evaporators. Therefore, the refrigerant pipe arrangement is complicated, and the cost of the system excessive.

SUMMARY OF THE INVENTION

It is a primary object of this invention to provide an improved refrigeration system for use in a vehicle, which is capable of functioning as both an air conditioning and refrigeration system.

It is another object of this invention to provide a refrigeration system which has the ability to effectively cool the refrigerator compartment without adversely affecting the cooling effect of the air conditioner in the passenger compartment.

It is still another object of this invention to achieve the above objects with only minor modification of present devices and at low cost.

A refrigeration system for an air conditioner and refrigerator of a vehicle according to this invention comprises a compressor, a condenser and two evaporators. One of the two evaporators is disposed in a duct of the passenger compartment air conditioner, and the other evaporator is disposed in the refrigerator compartment for refrigerating the food storage space. An electrical expansion valve is serially connected with the inlet side of the air conditioner evaporator. A shutoff valve for controlling the flow of refrigerant, and an expansion device, are serially connected at the inlet side of the refrigerator evaporator. In the closed state of the shutoff valve, operation of the expansion valve is controlled in accordance with the difference in refrigerant temperature across the air conditioner evaporator; and in the open state of the shutoff valve, operation of the expansion valve is controlled in accordance with the refrigerant temperature in the refrigerator evaporator.

Further objects, features and other aspects of this invention will be understood from the detailed description of the preferred embodiment of this invention while referring to the annexed drawings.

BRIEF DESCRIPTION OF THE DRAWINGS

FIG. 1 is a diagramatic view of a prior art refrigerant circuit.

FIG. 2 is schematic diagram of a refrigerant circuit for an air conditioning and refrigerating system in accordance with this invention.

FIG. 3 is a circuit diagram of the pulse motor used to drive the electrical expansion valve used in the air conditioning and refrigerating system of FIG. 2.

FIG. 4 is a table illustrating the operation of the pulse motor of FIG. 3.

DETAILED DESCRIPTION OF THE PREFERRED EMBODIMENT

Figure 5:
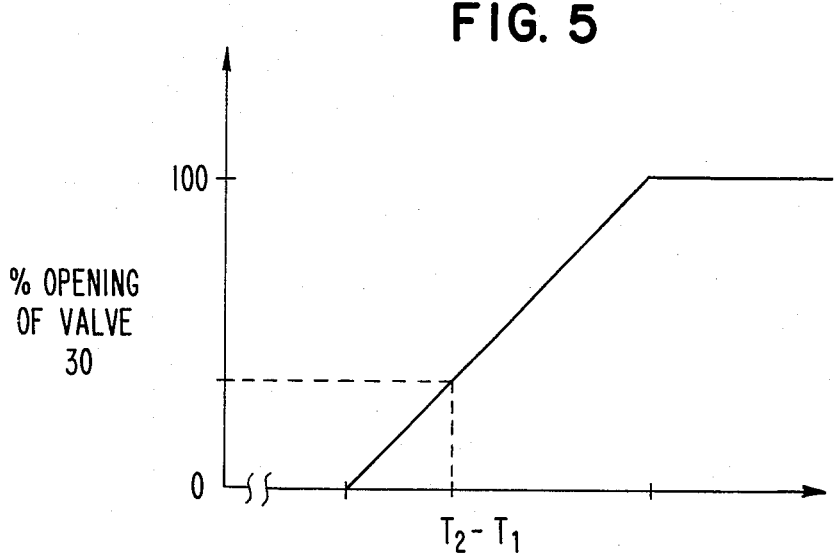
FIG. 5 is a graph illustrating the relationship between refrigerant temperature difference and opening of the expansion valve when the shutoff valve is closed.

Referring to FIG. 2, a refrigerant circuit for an air conditioning and refrigeration system in accordance with one embodiment of this invention is shown. The refrigerant circuit comprises a compressor 20 driven by the vehicle's engine through a magnetic clutch, a condenser 21 for condensing the high temperature pressurized refrigerant from the compressor, a receiver and dryer 22 for passing only liquid refrigerant while removing moisture and metal chips from the refrigerant, and two evaporators 23 and 24 which are connected in parallel with one another. One of these two evaporators (23) is disposed in a duct of the vehicle's air conditioner to cool the passenger compartment of the vehicle, and the other evaporator 24 is disposed in a refrigerator placed in the vehicle to cool the refrigerator compartment.

An electrical expansion valve 30 is placed on the inlet side evaporator 23 and serially connected therewith. Also, a shutoff valve 31 to control the opening and closing of the line to evaporator 24, and expansion device 32, for example a capillary tube, are serially connected with the inlet side of refrigeration evaporator 24. A check valve 33 is placed on the outlet side of refrigeration evaporator 24. (Instead of a capillary tube, any other fixed throttle type valve may be used as expansion device 32.)

Referring to FIGS. 3 and 4, the operation of electric expansion valve 30 will be explained. A needle valve is used as the valve member of electrical expansion valve 30, and a pulse motor is used as the driving motor for this valve member. Rotor 301a of pulse motor 301 is formed of a permanent magnet and rotated by magnetic forces generated between the magnetic pole on the motor and motor coils 301b, 301c. If electric power is applied to the motor coils 301b, 301c due to switching of switches SW1, SW2, SW3 and SW4, the rotor 301a is continuously rotated. In this embodiment of the pulse motor, if switching is done in a prescribed sequence from switch SW1 to SW4, the valve opens the line, and conversely, if switching is done in the reverse sequence, the valve closes the line.

Also, the degree of opening of expansion valve 30 is proportional to the number of pulses; therefore, the appropriate opening of expansion valve 30 can be achieved by selecting and applying an appropriate number of pulses. For example, if the valve is to be opened halfway from the fully closed position, P/2 pulses should be input for opening the valve, where P is number of pulses required to fully open or close the valve. Furthermore, if the valve is to be closed from fifty percent (50%) to twenty-five (25%), P/4 pulses should be input.

In the above structure of the air conditioning and refrigeration system, if shutoff valve 31 is closed, i.e., only evaporator 23 is being used, to cool the passenger compartment, the operation of electrical expansion valve 30 is controlled by the temperature difference (T2−T1) between the refrigerant temperature T1 on the inlet side of evaporator 23 detected by a temperature sensitive element, such as thermistor 40, and the refrigerant temperature T2 on the outlet side of evaporator 23, detected by thermistor 41. Electrical expansion valve 30 is opened or closed in accordance with the temperature difference (T2−T1) across evaporator 23 in order to hold a predetermined temperature difference. The predetermined temperature difference, and the corresponding degree of opening valve 30, are shown connected by the dashed line in FIG. 5.

On the other hand, if shutoff valve 31 is opened, i.e., evaporator 23 and evaporator 24 are both being operated, the operation of electrical expansion valve 30 is controlled by the refrigerant temperature T3 detected through thermistor 42 which is located on either the inlet side or the outlet side of evaporator 24. That is, the refrigerant flow through expansion valve 30 is controlled for holding the temperature T3 at a predetermined value. The predetermined value of T3, and the corresponding degree of opening valve 30, are shown connected by the dashed line in FIG. 6.

Figure 6:
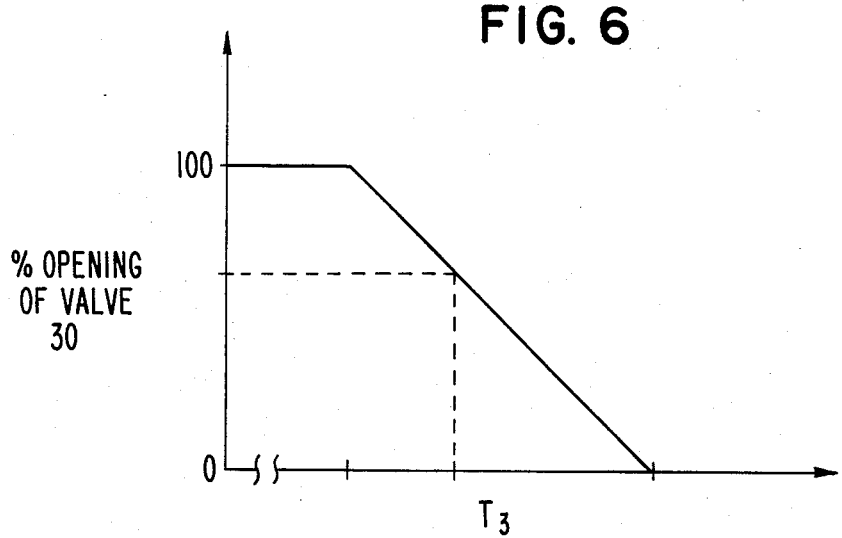
FIG. 6 is a graph illustrating the relationship between refrigerant temperature and opening of the expansion valve when the shutoff valve is open.

During the operation of the air conditioning and refrigeration system, if shutoff valve 31 is opened, pressurized refrigerant is admitted into evaporator 24 through capillary tube 32. Immediately upon opening shutoff valve 31, the temperature T3 detected through thermistor 43 is higher than the predetermined temperature; therefore, as shown in FIG. 6, the pulses are input to electrical expansion valve 30 to close the line to evaporator 23. Thus, the amount of refrigerant flow into evaporator 23 is reduced, and the amount of refrigerant flow into evaporator 24 through capillary tube 32 is increased. As the result of increasing refrigerant flow, the temperature in evaporator 24 is lowered and evaporator 24 cools the refrigerator compartment. When temperature T3 is sufficiently reduced, the pulses input to expansion valve 30 cause it to open, and thereby the amount of refrigerant flow through capillary tube 32 is reduced. Thereafter, the operation of expansion valve 30 is controlled in accordance with temperature T3 on refrigerating evaporator 24.

Since the volume of the refrigerator compartment is small, for example 10 or 15 liters, the refrigerator compartment requires much less cooling capacity than the passenger compartment. Therefore, even if the refrigerant is preferentially passed through evaporator 24, the refrigerator is easily cooled down to −20° C. after a short time. Also, since insulation of the refrigerator is improved to prevent heat absorption, the interior temperature of the refrigerator can be maintained practically constant for several minutes, even if shutoff valve 31 is closed, i.e., if the flow of refrigerant into evaporator 24 is stopped.

Figure 7:
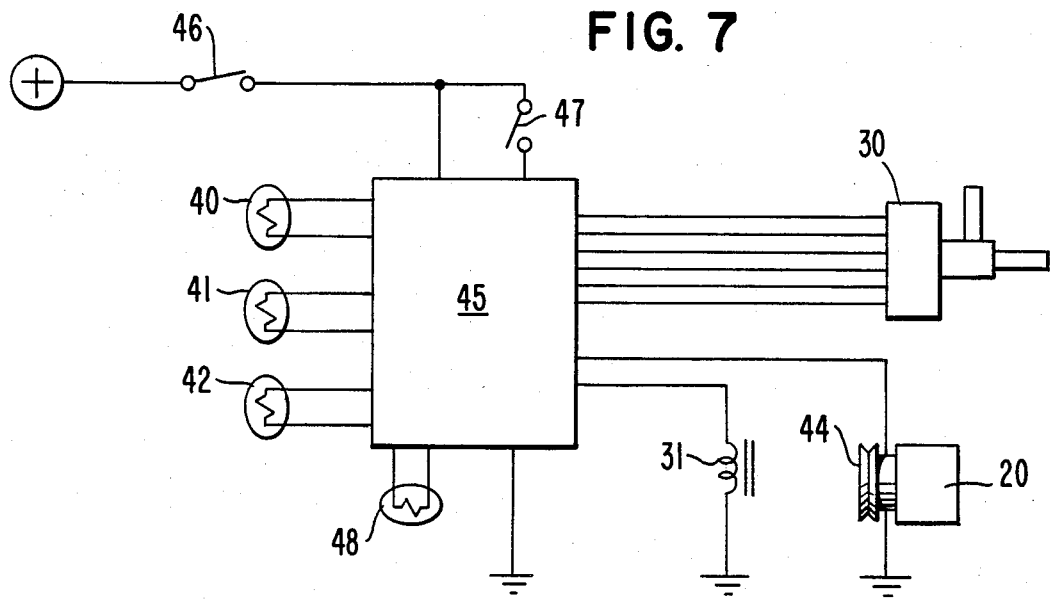
FIG. 7 is an electrical circuit diagram of the control device for the air conditioning and refrigeration system of the invention.

Referring to FIG. 7, the pulse motor for electrical expansion valve 30, shutoff valve 31, and magnetic clutch 44 for compressor 20 are all controlled by control device 45. Control device 45 is supplied with electric power through main switch 46 and receives temperature signals from thermistors 40, 41, 42 disposed on evaporators 23, 24. Furthermore, a refrigerator control switch 47 is connected with control device 45 to control the operation of the refrigerator. A thermistor 48 for detecting the temperature inside the refrigerator compartment may be used.

Figure 8:
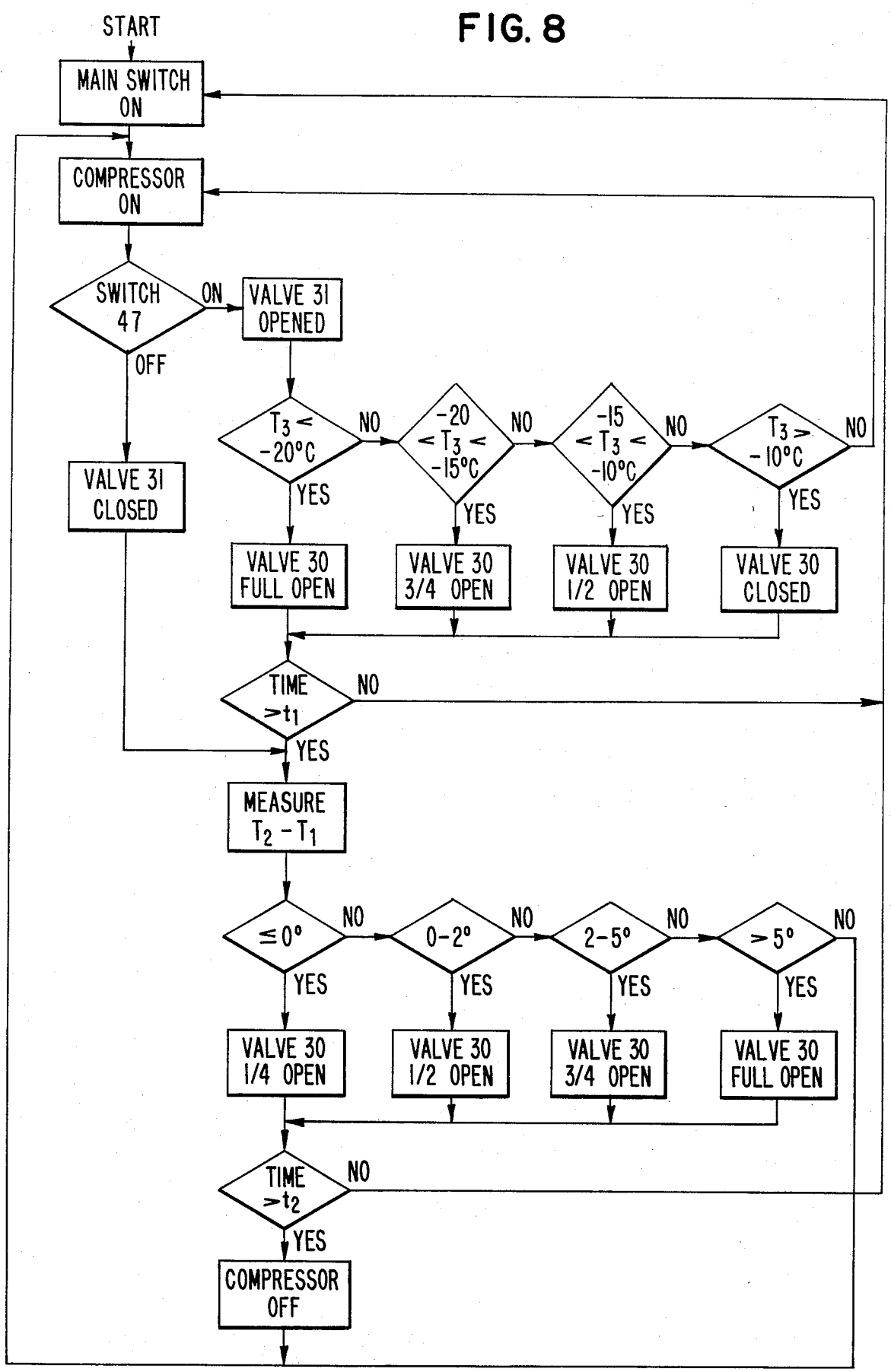
FIG. 8 is a flow chart illustrating the operation of control device 45 shown in FIG. 7.

As to the operation of the air conditioning and refrigeration system, when main switch 46 is turned on to supply electric power to control device 45, magnetic clutch 44 is operated to drive compressor 20, and also electrical expansion valve 30 is operated to supply refrigerant to evaporator 23. Thus, the air conditioner is operated and the passenger compartment is cooled. During the operation of the air conditioner, if refrigerator control switch 47 is turned on, the interior temperature of the refrigerator, which is detected by thermistor 48, is higher than the predetermined temperature; therefore shutoff valve 31 is opened and operation of expansion valve 30 is controlled by the refrigerant temperature in evaporator 24. Thus, the refrigerant temperature in the refrigerator is suddenly lowered, and the operation of the air conditioner is suspended. When the temperature in the refrigerator reaches the predetermined temperature, valve 31 is closed, and operating control for expansion valve 30 once again depends upon the refrigerant temperature difference across evaporator 23. Change of control for expansion valve 30 is cycled due to changes in temperature in the refrigerator. Therefore, the temperatures in the passenger compartment of the vehicle and in the refrigerator compartment are respectively held at predetermined temperatures due to operation of the expansion valve. Operation of the system is described in the flow chart of FIG. 8.

In the above-mentioned embodiment, the shutoff valve 31 is operated to correspond with the change of temperature detected through a thermistor disposed within the interior of the refrigerator. Alternatively, the operation of the shutoff valve may be controlled by a timer device, e.g., the opening of shutoff valve 31 may be achieved by detecting temperature through thermistor 42 (which is used for controlling the operation of electrical expansion valve 30), and the closing of shutoff valve 31 may be achieved by the timer device. Therefore, the shutoff valve 31 is closed for a predetermined time interval after its opening. Also, the opening and closing of shutoff valve 31 can be totally controlled by a timer device, i.e., opening and closing of the valve occur at predetermined times.

Also, the predetermined time determined by the timer device may be changeable depending on the temperature in the refrigerator or refrigerating evaporator.

This invention has been described in detail in connection with the preferred embodiment; but this is by way of example only, and this invention is not to be considered as restricted thereto. It will be easily understood by those skilled in the art that other variations and modifications can be easily made within the scope of this invention as claimed.

What is claimed is:

1. In a refrigeration system cooling both a vehicle passenger compartment and a refrigerator compartment located in the vehicle, the refrigeration system having a condenser to condense a pressurized refrigerant, a first evaporator receiving a first portion of the condensed refrigerant to heat the first portion by absorbing heat from the vehicle compartment, a second evaporator receiving a second portion of the condensed refrigerant to heat the second portion by absorbing heat from the refrigerator compartment, and a compressor receiving the heated refrigerant from the first and second evaporators to produce the pressurized refrigerant, the improvement comprising:

an expansion valve connected between the condenser and the first evaporator to vary the first portion of the condensed refrigerant in accordance with a variable control signal and to expand and cool the first portion;

a shutoff valve connected between the condenser and the second evaporator to control the admission of the second portion of the condensed refrigerant to the second evaporator, said shutoff valve having a closed state in which no refrigerant is admitted to the second evaporator and an open state in which the second portion is admitted to the second evaporator;

an expansion device connected in series between said shutoff valve and the second evaporator to expand and cool the second portion; and control means responsive to the state of said shutoff valve, to a temperature of the first portion, and to a temperature of the second portion, to generate the control signal in accordance with the following criteria:

a. when said shutoff valve is closed, the control signal is generated in accordance with the temperature of the first portion; and b. when said shutoff valve is open, the control signal is generated in accordance with the temperature of the second portion.

2. The improvement of claim 1 wherein said control means further controls the state of said shutoff valve such that said shutoff valve is closed when the temperature of the second portion falls below a reference temperature and said shutoff valve is opened when the temperature of the second portion rises above the reference temperature.

3. The improvement of claim 1 wherein said control means further controls the state of said shutoff valve such that said shutoff valve is opened when the temperature of the second portion rises above a reference temperature and closed after a predetermined time interval.

4. The improvement of claim 1 wherein said control means further controls the state of said shutoff valve such that said shutoff valve is opened at a first predetermined time and closed at a second predetermined time.

5. The improvement of claim 4 wherein the first and second predetermined times are varied in accordance with the temperature of the second portion.

6. The improvement of claim 4 wherein the first and second times are varied in accordance with a temperature within the refrigerator compartment, said control means being further responsive to the temperature within the refrigerator compartment.

7. The improvement of claim 1 wherein said expansion device comprises a fixed throttle type valve.

* * * * *